(12) United States Patent
Hyeon

(10) Patent No.: US 7,407,527 B2
(45) Date of Patent: Aug. 5, 2008

(54) SYNTHESIS OF MONO-DISPERSE AND HIGHLY CRYSTALLINE NANO-PARTICLES OF METALS, ALLOYS, METAL-OXIDES, AND MULTI-METALLIC OXIDES WITHOUT A SIZE-SELECTION PROCESS

(75) Inventor: Taeghwan Hyeon, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 454 days.

(21) Appl. No.: 10/490,745
(22) PCT Filed: Jan. 22, 2002
(86) PCT No.: PCT/KR02/00101

§ 371 (c)(1),
(2), (4) Date: Apr. 9, 2004

(87) PCT Pub. No.: WO03/031323

PCT Pub. Date: Apr. 17, 2003

(65) Prior Publication Data

US 2004/0247503 A1 Dec. 9, 2004

(30) Foreign Application Priority Data

Oct. 12, 2001 (KR) ................................ 200163077

(51) Int. Cl.
B22F 9/24 (2006.01)

(52) U.S. Cl. .............................. 75/351; 75/362; 75/365; 75/371; 423/594; 423/632

(58) Field of Classification Search .................... 75/351, 75/362, 365, 371; 423/594, 632
See application file for complete search history.

(56) References Cited

U.S. PATENT DOCUMENTS 5,759,230 A 6/1998 Chow et al.
5,958,361 A 9/1999 Laine et al.
6,262,129 B1* 7/2001 Murray et al. ................. 516/33
6,268,014 B1 7/2001 Eberspacher et al.
6,413,489 B1* 7/2002 Ying et al. ................... 423/600
6,572,673 B2* 6/2003 Lee et al. ....................... 75/362
6,752,979 B1* 6/2004 Talbot et al. ............. 423/592.1
2006/0225535 A1* 10/2006 Mainwaring ................. 75/348

OTHER PUBLICATIONS

Shouheng SUN et al., "Synthesis of monodisperse Cobalt Nanocrystals and their Assembly into magnetic Superlattices", Journal of Applied Physics, vol. 85, No. 8, pp. 4325-4330, Apr. 15, 1999.*

(Continued)

Primary Examiner—George Wyszomierski
(74) Attorney, Agent, or Firm—The Nath Law Group; Joshua B. Goldberg; Tanya E. Harkins

(57) ABSTRACT

A synthetic method of fabricating highly crystalline and monodisperse nanoparticles of metals, multi-metallic alloys, monometallic oxides and multi-metallic oxides without a size selection process are disclosed. A typical synthetic method comprises the steps of, synthesis of a metal surfactant complex from the reaction of a metal precursor and a surfactant, high temperature thermal decomposition of the metal surfactant complex to produce monodisperse metal nanoparticles, and completing the formation of synthesized metal, metal alloy or metal oxide nanoparticles by adding a poor solvent followed by centrifuging. For obtaining highly crystalline monodisperse nanoparticles, additional steps are necessary as described in the invention. The resulting nanoparticles have excellent magnetic property for many applications.

31 Claims, 9 Drawing Sheets

OTHER PUBLICATIONS

Charles P. Gibson et al., "Synthesis and Characterization of Anisometric Cobalt Nanoclusters", Science, vol. 267, pp. 1338-1340 (1995).

K. Bridger et al., "Magnetic Characteristics of Ultrafine Fe Particles reduced form Uniform Iron Oxide Particles", J. Appl. Phys. vol. 61, No. 8, pp. 3323-3325 (1987).

C. Salling et al. "Measuring the Coercivity of Individual Sub-Micron Ferromagnetic Particles by Lorentz Microscopy", IEEE Transaction on Magnetics, vol. 27, No. 6, pp. 5184-5186(1991).

Thomas W. Smith et al., "Colloidal iron Dispersions Prepared Via the Polymer-Catalyzed Decomposition of Iron Pentacarbonyl", J. Phys. Chem., vol. 84, pp. 1621-1629.

Kenneth S. Suslick et al., "Sonochemical Synthesis of Iron Colloids", J. Am. Chem. Soc., vol. 118, pp. 11960-11961 (1996).

C. Petit et al., "Cobalt nanosized Particles Organized in a 2D Superlattice: Synthesis, Characterization, and Magnetic Properties", J. Phys, Chem. B. vol. 103, pp. 1805-1810 (1999).

C. B. Murray et al., "Synthesis and Characterization of Nearly Monodisperse CdE (E=S, Se, Te) Semiconductor Nanocrystallites", vol. 115, pp. 8706-8715 (1993).

Sang-Jae Park et al., "Synthesis and Magnetic Studies of Uniform Iron Nanorods and Nanospheres", J. Am. Chem. Soc., vol. 122, pp. 8581-8582, (2000).

Victor F. Puntes et al., "Colloidal Nanocrystal Shape and Size Control: The Case of Cobalt", Science, vol. 291, pp. 2115-2117 (2001).

Jörg Rockenberger et al., "A New Nonhydrolytic Single-Precursor Approach to Surfactant-Capped Nanocrystals of transition Metal Oxiders", J. m. Chem. Soc., vol. 121, pp. 11595-11596 (1999).

* cited by examiner

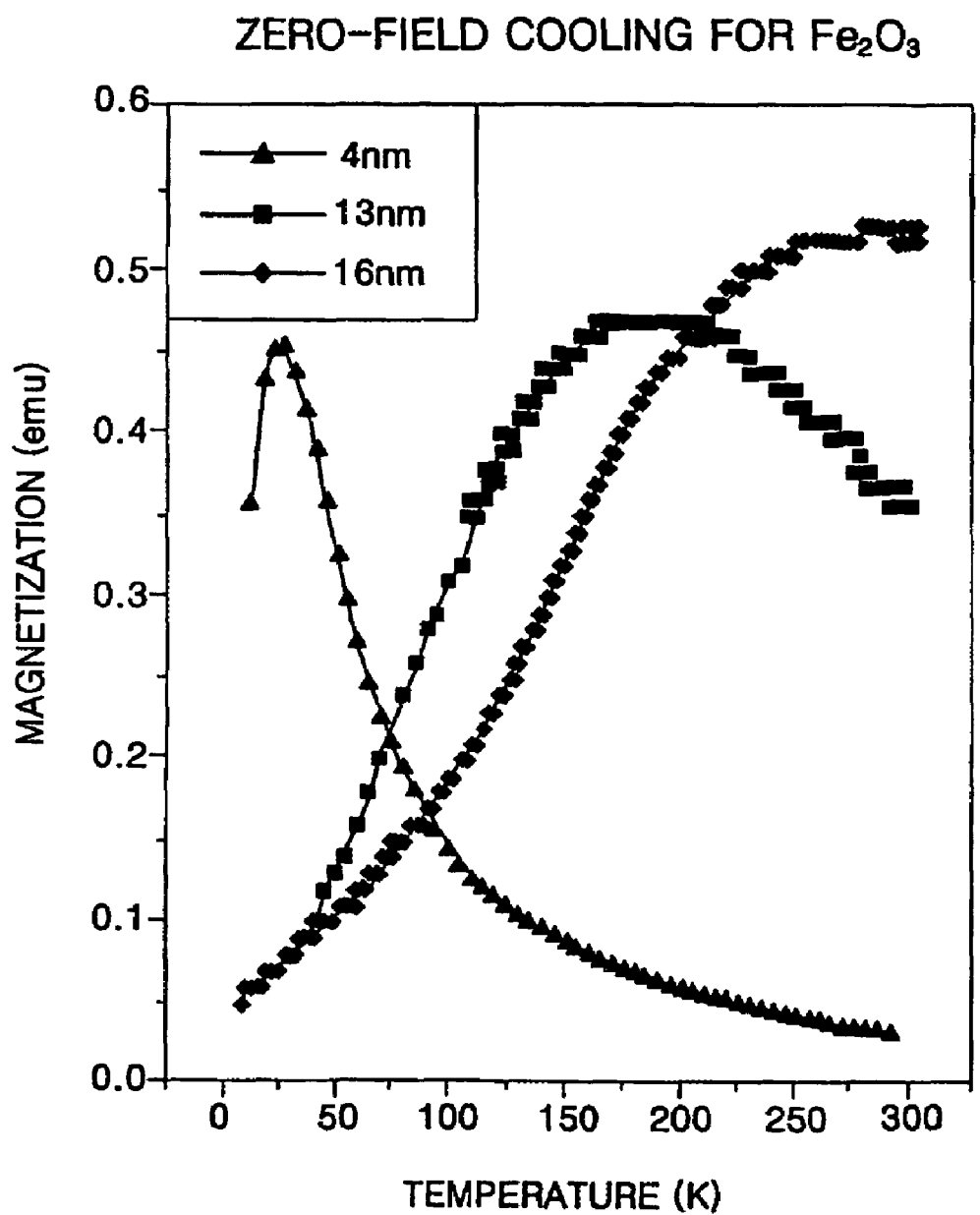

SYNTHESIS OF MONO-DISPERSE AND HIGHLY CRYSTALLINE NANO-PARTICLES OF METALS, ALLOYS, METAL-OXIDES, AND MULTI-METALLIC OXIDES WITHOUT A SIZE-SELECTION PROCESS

TECHNICAL FIELD

The present invention relates to a method for synthesizing highly crystalline and monodisperse nanoparticles of metals, multi-metallic alloys, monometallic oxides and multi-metallic oxides without a size-selection process.

BACKGROUND ART

The advent of uniform nanoparticles has made a significant impact on many different technological areas such as high density magnetic data storage elements, high density single-electron transistor devices and highly efficient laser beam sources. These nanometer-sized particles possess new and interesting electrical, magnetic and optical properties compared to the existing and widely known particles in the sizes larger than micrometer range.

The surface property of nanoparticle materials is very critical, because nanoparticles have high surface to volume ratio and high surface defect ratio in comparison with bulk materials. In addition, quantum confinement effect of nanoparticles, which have intermediate sizes between molecules and macroscopic bulk materials, has increased the scientific and technological interests. These nanoparticles find applications in nanodevices, nonlinear optical materials, catalysts, and data storage devices. In particular, in the era of information and multimedia, there are increasing demands for the development of magnetic data storage devices with high density, high speed, low electrical power consumption, and ultra-low weight. Recently intensive research has been conducted for the development of magnetic storage devices using magnetic nanoparticles. As a result, the synthesis of monodisperse nanoparticles with controllable sizes has been intensively pursued. However the synthesis of monodisperse magnetic nanoparticles turned out to be very difficult because of strong electromagnetic interaction between nanoparticles. [Science, 267 (1995) 1338, Journal of Applied Physics, 61 (1987) 3323, IEEE Transactions on Magnetism, 27 (1991) 5184]

Maghemite($\gamma$-$Fe_2O_3$), a ferrimagnetic iron oxide material, has been commonly used as magnetic storage media for commercial magnetic tape and hard disk device applications since 1937, and even today it is being used widely as an important magnetic material essentially for storage media. However, due to the fact that the size of the existing maghemite particles are in the range of micrometers and the minimum area required for a magnetic storage element is determined by the size of the magnetic particles, the density of the magnetic media is limited by the size of the magnetic particles.

Recently, intensive research has been conducted for synthesizing uniform nanometer-sized magnetic nanoparticles for their applications to high density magnetic data storage media. In the conventional magnetic data storage media, the minimum magnetic storage element, which is called a magnetic domain, is the minimum magnetic unit oriented along the applied magnetic field, and the conventional magnetic storage element is an aggregate of many small crystals of magnetic materials. However, unlike the conventional magnetic data storage media, the nanoparticles with uniform size and shape, if used as magnetic storage media, increases the storage area density significantly, whereby a magnetic storage density of so-called multi-terabits/$in^2$ based on the prospect of one particle-on-one bit system can be achieved. There exist already various synthetic methods for producing uniform spherical magnetic nanoparticles. Some of the examples are "Thermal decomposition of organometallic precursors", [Journal of Physical Chemistry, 84 (1980) 1621], "Sonochemical decomposition of organometallic precursors", [Journal of American Chemical Society, 118 (1996) 11960], "High temperature reduction of metal salts", [Journal of Applied Physics, 85 (1999) 4325, also Korean Patent KR2000-0011546], and "Reduction of metal salts in reverse micelles", [Journal of Physical Chemistry B, 103 (1999) 1805].

In particular, "Method of short-burst of nucleation induced by rapid injection of precursors into a hot surfactant solution followed by aging", [Journal of American Chemical Society, 115 (1993) 8706], has been most widely used for synthesizing monodisperse nanoparticles. In other methods, rod-shaped magnetic nanoparticles were synthesized through the use of oriented growth of spherical nanoparticles [Journal of American Chemical Society, 122 (2000) 8581] and [Science 291 (2001) 2115].

However, the size of the nanoparticles produced using these synthetic methods is not uniform. In addition, compared to the nanoparticles of II-VI semiconductors and noble metals such as gold, silver, and platinum, relatively very little research has been conducted for the synthesis of monodisperse nanoparticles of transition metals and oxides. Also, it is a well-known fact that synthesizing uniform nanoparticles in their size and shape is not an easy task.

Meanwhile, Alivisatos, et al. disclosed the synthesis of nanoparticles of transition metal oxides such as iron oxide [gamma-$Fe_2O_3$, maghemite], manganese oxide[$Mn_3O_4$] and copper oxide[$Cu_2O$] by thermally decomposing metal Cupferron[N-nitrosophenylhydroxylamine[$C_6H_5N(NO)O^-$] precursors at high temperature in the presence of surfactant. However, the resultant nanoparticles are irregular in size and their crystallinity is very poor, and therefore, it is very difficult to form superlattices for the applications to magnetic data storage media. In addition, very expensive metal Cupferron complex precursor is used [Journal of American Chemical Society, 121 (1999) 11595].

Therefore, the main objective of the present invention is to disclose a method of synthesizing nanoparticles that overcome the deficiencies aforementioned.

DETAILED DESCRIPTION OF THE INVENTION

The present invention is to disclose synthetic methods of fabricating uniform nanoparticles of metals, alloys, monometallic oxides and multi-metallic oxides without a size-selection process, where said particles are generally spherically shaped and uniform in size and shape, and as a result said uniform nanoparticles have desired properties aforementioned. Such uniformity in size in diameter and of shape allows the nanoparticles to form superlattices by self-assembly, thereby said nanoparticles synthesized according to the present invention have a property of forming superlattices and said nanoparticles can be used as a high density magnetic data storage media as high as in the range of terabits/$in^2$.

Another object of the present invention is to disclose a synthetic method of fabricating nanoparticles of metals, alloys, mono-metallic oxides and multi-metallic oxides with the characteristics, where the nanoparticles can be dispersed many times in various solvents without being aggregated, and the nanoparticles maintain the same particle size and also they do not aggregate even when said nanoparticles are recovered in a powder form.

Such physical properties of non-aggregation and maintaining the same particle size when said nanoparticles are recovered according to the present invention expand the possibility of applications area and the usability of said nanoparticles and also suggest an improved possibility of recycling and reusing.

Another object of the present invention is to disclose methods of synthesizing highly crystalline and monodisperse spherical metal particles by high temperature decomposition and aging of metal surfactant complex produced by reacting a precursor and a surfactant. The object of the present invention is to further disclose methods of synthesizing metal oxide nanoparticles uniform in size and shape by a controlled oxidation process of the resultant metal nanoparticles by using an oxidant. Said monodisperse nanoparticles synthesized according to the present invention as described previously induce the formation of superlattices through a self-assembly process, and as a result said monodisperse nanoparticle superlattices can be used as a high density magnetic data storage media The synthetic method of fabricating nanoparticles of metals and metal oxides is described in reference to FIGS. 1 through 3 in the following.

FIG. 1 is a flowchart showing the process of synthesizing nanoparticles of metals and metal oxides according to the present invention. FIG. 2 is a flowchart showing the process of directly synthesizing metal oxide nanoparticles without going through the process of synthesizing metal nanoparticles first according to the present invention. FIG. 3 is a flowchart showing the process of synthesizing larger nanoparticles by growing the nanoparticles already produced according to the present invention.

According to the present invention and in reference to FIG. 1, nanoparticles of metals and metal oxides can be synthesized by following three steps described below. Step A 101, 102: After preparing a metal precursor and a suitable surfactant in a solvent, a metal surfactant complex is synthesized by a process of reaction of a metal precursor and a surfactant. Step B 103: Monodisperse metal nanoparticles are produced by decomposing the metal surfactant complex. Step C 104: Completion of the formation of said synthesized metal nanoparticles by adding a poor solvent followed by centrifuging. Furthermore, the following additional step, Step D 105, 106, is followed in order to synthetically produce nanoparticles of metal oxides. Step D 105, 106: After dispersing metal nanoparticles, said nanoparticles are oxidized using an oxidant to produce metal oxide nanoparticles, and then the metal oxide nanoparticles are obtained.

According to another aspect of the present invention and referring to FIG. 2, metal oxide nanoparticles can be synthesized directly by rapidly injecting a metal precursor into a solution containing both surfactant and oxidant followed by thermal decomposition, and then finally by a process of obtaining desired metal oxide nanoparticles.

According to yet another aspect of the present invention, larger nanoparticles in size in the range of about 12 nm to 50 nm can be synthesized. Referring to FIG. 3, after synthesizing smaller nanoparticles in size in the range of about 4 nm to 11 nm following the procedures described in reference to FIGS. 1 and 2 above, a metal-surfactant complex is added to the previously prepared nanoparticles of size in the range from about 4 nm to 11 nm followed by a thermal decomposition process to obtain larger size nanoparticles ranging from about 12 nm to 50 nm.

Normally, all the reaction processes described above in reference to FIGS. 1 through 3, may be carried out under an inert gas environment in a glove box filled with an inert gas such as nitrogen or argon, or the Schrenk technique can be utilized.

More specifically, in reference to FIG. 1 and in Step A 101, 102 in synthesizing metal nanoparticles, metallic precursors are injected into a surfactant solution at a temperature ranging from 30° C. to 200° C. for producing metal-surfactant complexes. In Step B 103, the synthesized metal surfactant complex is thermally decomposed by refluxing at a temperature ranging from 30° C. to 500° C. in order to obtain metal nanoparticles.

According to the present invention, following metal precursors can be used for producing the desired nanoparticles; various organometallic compounds including typically iron pentacarbonyl[$Fe(CO)_5$], ferrocene, cobalt tricarbonylnitrosyl[$Co(CO)_3(NO)$], cyclopentadienylcobalt-tricarbonyl [$Co(CO)_3(C_5H_5)$)], dicobalt octacarbonyl[$Co_2(CO)_8$], chromium hexacarbonyl[$Cr(CO)_6$], Nickel tetracarbonyl[$Ni(CO)_4$], dimanganese decacarbonyl[$Mn_2(CO)O_{10}$], metal acetylacetonate compounds including typically iron acetylacetonate[$Fe(acac)_3$], cobalt acetylacetonate[$Co(acac)_3$], barium acetylacetonate[$Ba(acac)_2$]$_1$, strontium acetylacetonate[$Sr(acac)_2$], platinum acetylacetonate[$Pt(acac)_2$], palladium acetylacetonate[$Pd(acac)_2$], and metal alkoxide compounds including typically titanium tetraisopropoxide[$Ti(OC_3H_7)_4$], zirconium tetrabutoxide[$Zr(OC_4H_9)_4$].

More broadly, the metals used in the precursors according to the present invention include typically iron[Fe], cobalt [Co], nickel[Ni], chromium[Cr], manganese[Mn], barium [Ba], strontium[Sr], titanium[Ti], zirconium[Zr], platinum [Pt], palladium[Pd], and the groups II through X transition metals in particular. The ligands include typically carbonyl [CO], nitrosyl[NO], cyclopentadienyl[$C_5H_5$], acetate, aromatic compounds and alkoxide family. The following metal salts can also be used as precursors. These metal salts include typically iron(III) chloride[$FeCl_3$], iron(II) chloride[$FeCl_2$], iron(II) sulfate[$FeSO_4$], iron(III) nitrate[$Fe(NO_3)_3$], cobalt (III) chloride[$CoCl_3$], cobalt(II) chloride[$CoCl_2$], cobalt(III) nitrate[$Co(NO_3)_3$], nickel(II) sulfate[$NiSO_4$], nickel(II) chloride[$NiCl_2$], nickel(II) nitrate[$Ni(NO_3)_2$], titanium tetrachloride[$TiCl_4$], zirconium tetrachloride[$ZrCl_4$], hydrogen hexachloroplatinate(IV)[$H_2PtCl_6$], hydrogen hexachloropalladiate(IV) [$H_2PdCl_6$], barium chloride[$BaCl_2$], barium sulfate[$BaSO_4$], strontium chloride[$SrCl_2$] and strontium sulfate [$SrSO_4$]. These metal salts consist of various metals including typically iron[Fe], cobalt[Co], nickel[Ni], chromium[Cr], manganese[Mn], barium[Ba], strontium[Sr], titanium[Ti], zirconium[Zr], platinum[Pt], palladium[Pd], and anions including typically chloride[$Cl^-$], nitrate[$NO_3^-$], sulfate [$SO_4^{2-}$], phosphate[$PO_4^{3-}$] and alkoxides. Furthermore, in synthesizing nanoparticles of alloys and multi-metallic oxides, mixtures of two or more metal precursors mentioned above can be used as precursors according to the present invention.

According to the present invention, referring to FIG. 1, in Step A 101, 102, following surfactants can be used for stabilizing the nanoparticles including cationic surfactants including typically alkyltrimethylammonium halides such as cetyltrimethylammonium bromide, neutral surfactants including typically oleic acid, trioctylphosphine oxide(TOPO) and triphenylphosphine(TOP), alkyl amines such as oleylamine, trioctylamine, octylamine and alkyl thiols, and anionic surfactants including typically sodium alkyl sulfates and sodium alkyl phosphates. Mixtures of two or more surfactants can be used as described in some cases.

The oxidants used in the present invention include typically amine N-oxide such as pyridine N-oxide and trimethylamine N-oxide, and also hydrogen peroxide and oxygen.

The solvents used in the present invention should have high enough boiling temperature because the metal-surfactant precursors must be decomposed to produce metal nanoparticles. Such solvents include typically ethers such as octyl ether, butyl ether, hexyl ether and decyl ether, heterocyclic compounds such as pyridine and tetrahydrofurane (THF), and also aromatic compounds such as toluene, xylene, mesitylene, benzene, and dimethyl sulfoxide (DMSO), and dimethylformamide (DMF), and alcohols such as octyl alcohol, and decanol, and hydrocarbons such as pentane, hexane, heptane, octane, decane, dodecane, tetradecane, hexadecane, and also water. Again, in order to thermally decompose a metal surfactant complex for synthesizing desired nanoparticles according to the present invention, the solvent to be used should have preferably high boiling temperature close to the thermal decomposition temperature of said metal surfactant complex.

According to the present invention, metal nanoparticles can be synthesized by controlled decomposition of a metal surfactant complex, and also metal oxide nanoparticles can be synthesized by a further process of oxidation of the resulting metal nanoparticles obtained through the previous synthesis step. The size and shape of said nanoparticles can be controlled by varying the synthesis parameters such as primarily the volume of a surfactant, reaction temperature and reaction time. For example, referring to FIG. 1, the particle size in diameter of the metal nanoparticles synthesized in Step B 103 is uniform and this uniformity in size is preserved when metal oxide nanoparticles are synthesized in Step D 105, 106 meaning that the size of the metal oxide nanoparticles does not change when the metal nanoparticles are synthesized according to the present invention. Furthermore, the size of nanoparticles can be easily controlled from 2 nm to as large as 50 nm by varying the concentration of the surfactant with respect to the solvent used, meaning that monodisperse nanoparticles of metals and metal oxides can be synthesized and the size of the nanoparticles can be easily controlled according to the present invention. When the size of nanoparticles is controlled by varying the volume of the surfactant used, it was confirmed experimentally that the diameter of the metal nanoparticles is increased in proportion to the volume of the surfactant used in Step A 101, 102. Therefore, metal and metal oxide of nanoparticles in various sizes can be synthesized by controlling the ratio of metallic precursor to surfactant within a wide range according to the present invention, wherein the applicable molar ratio of metallic precursor to surfactant ranges from 1:0.1 to 1:100, and preferably from 1:0.1 to 1:20. Furthermore, it was also experimentally confirmed that the size of the metal nanoparticles became smaller as the thermal decomposition temperature was lowered as well as the reaction time was shortened.

According to the present invention, as described previously, a metal surfactant complex is synthesized first by reacting a metal precursor and a surfactant, where the reaction of a metal precursor and a surfactant can be performed at room temperature or lower than room temperature depending upon the types of the metal precursors and surfactants used, but generally a low level of heating is necessary. During the process of synthesizing a metal surfactant complex, the reaction temperature is maintained preferably in the range from 30° C. to 200° C.

According to the present invention, monodisperse metal nanoparticles with uniform size and shape are formed when a metal surfactant complex is thermally decomposed under an appropriate reaction condition, where the temperature of the thermal decomposition of the metal surfactant complex varies somewhat depending upon the type of the metal surfactant complex used. Also, in order to thermally decompose the metal surfactant complex, preferably, the complex is heated to a temperature in the range of 50° C. to 500° C. and such temperature level is maintained in order to carry out the thermal decomposition of the metal surfactant complex according to the present invention.

Furthermore, according to the present invention, in order to synthesize metal oxide nanoparticles, the amount of the oxidant needed for oxidizing the metal nanoparticles is determined in such a way that the amount is sufficient enough to oxidize all the metal nanoparticles desired, where the molar ratio of the nanoparticles and the oxidant ranges, in general, from 1:0.1 to 1:100, and preferably in the range from 1:0.1 to 1:20.

In the following, referring to FIG. 2, a procedure of synthesizing metal oxide nanoparticles by reacting a metal precursor, a surfactant and an oxidant according to the present invention 201, 202, 203. Specifically, a metal precursor, a surfactant and an oxidant are mixed at low temperature, for example, in the range from −100° C. to 200° C., and preferably at the level of temperature about 100° C. The resulting mixture is then heated to a level of temperature ranging from 30° C. and 500° C. and preferably at the level of temperature about 300° C. in order to complete the process of synthesizing metal oxide nanoparticles. During this heating period the heating rate is controlled preferably within the range between 1° C./min. to 20° C./min. depending upon the desired property of the nanoparticles according to the present invention.

Furthermore, referring to FIG. 3, nanoparticles larger in size ranging from 12 nm to 50 nm can be synthesized, as described previously, by thermally decomposing the mixture of previously synthesized nanoparticles in the size normally less than 11 nm and a metal surfactant complex with a molar rate ranging from 1:0.1 to 1:100 according to the present invention 301, 302, 303, 304.

According to the present invention, sufficient reaction time in each processing step is given in order to complete each step of synthesis generally ranging from 1 minute to 24 hours. In addition, the desired nanoparticles of metals and metal oxides can be separated and retrieved by centrifugation of the reaction mixture or the precipitation by adding a poor solvent according to the present invention as described previously, where the poor solvent is a solvent that can not disperse nanoparticles effectively and induce the precipitation of the nanoparticles.

The nanoparticles with particle size ranging from 2 nm to 50 nm, synthesized according to the present invention, form superlattices due primarily to the characteristics of uniformity in size and shape that the nanoparticles possess according to the present invention, thereby such nanoparticles exhibit a good magnetic property. In particular, the magnetic nanoparticles bigger than 16 nm in diameter exhibit the property of ferromagnetism or ferromagnetism with high magnetic moment sufficient to be used as magnetic data storage elements, and furthermore, the nanoparticles as large as 50 nm synthesized using the procedure described above, according to the present invention, have potentially many uses in industrial applications.

In general, nanostructured magnetic materials exhibit different temperature-dependent magnetic characteristics such as ferromagnetism at low temperature or superparamagnetism at high temperature. The reversible transition temperature between ferromagnetism and superparamagnetism is called blocking temperature ($T_b$). The blocking temperature should be high, because the materials should exhibit ferromagnetism or ferromagnetism for suitable applications to magnetic data storage media.

BRIEF DESCRIPTION OF THE DRAWINGS

FIG. 17 is a graph showing the relationships of magnetization versus temperature for the spherical iron oxide nanoparticles in three different sizes of 4 nm, 13 nm and 16 nm in diameter synthesized according to the Embodiments 4, 5, and 6, respectively.

BEST MODES FOR CARRYING OUT THE INVENTION

As aforementioned, spherically shaped metal oxide nanoparticles can be synthesized according to the present invention, where such nanoparticles exhibit an excellent magnetic property for magnetic data storage media applications, and such property can be demonstrated by measuring the blocking temperatures of various sizes of metal oxide nanoparticles according to the present invention.

The procedures and results of the best modes of carrying out the present invention are described in the following. However, the procedures and results presented here are merely illustrative examples of carrying out the implementation of the underlying ideas and procedures of the present invention, and the presentation of the exemplary embodiments given in the following is neither intended for exhaustively illustrating the basic ideas and procedures nor limiting the scope of the present invention. Furthermore, those who are familiar with the art should be able to easily derive variations and modifications of the underlying ideas and procedures of the present invention.

EMBODIMENT 1

Synthesis of Monodisperse and Spherically Shaped Iron Nanoparticles

Figure 1:
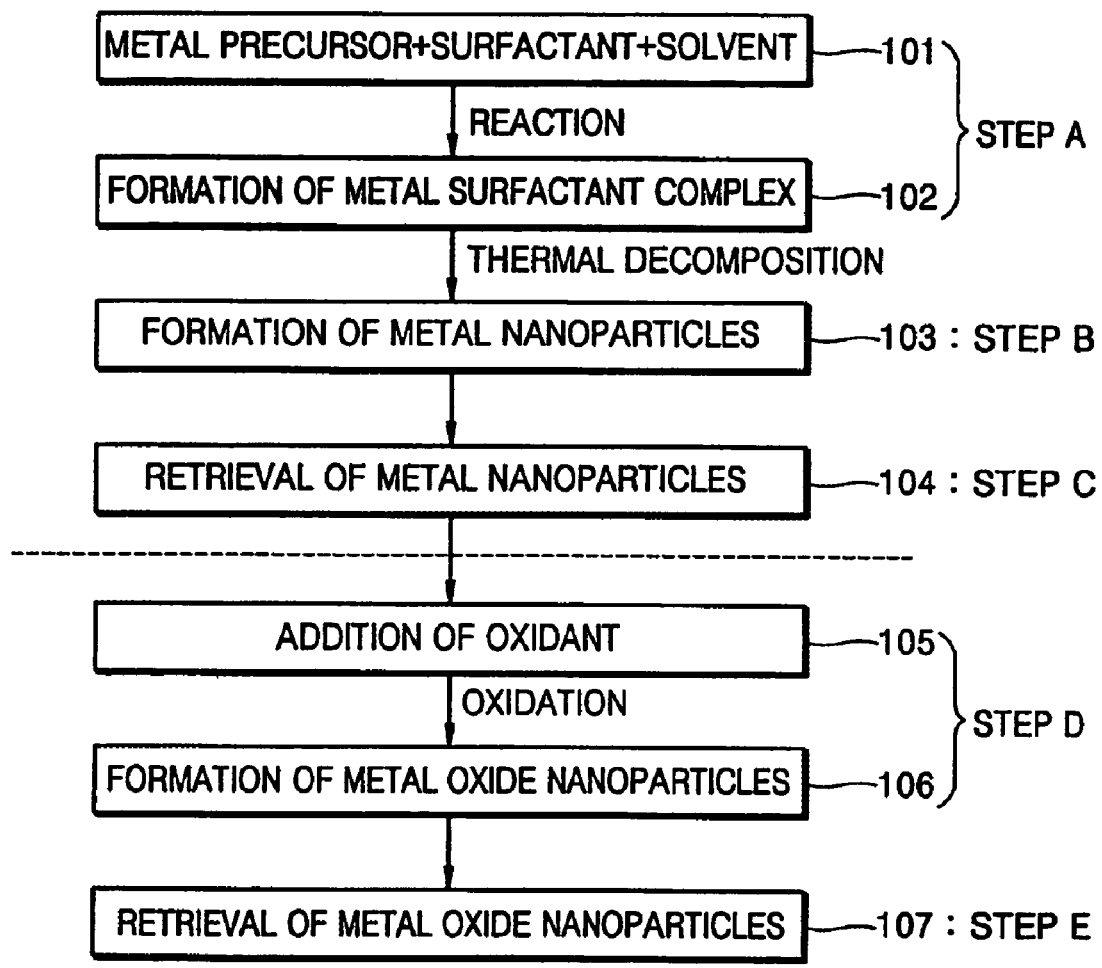
FIG. 1 is a schematic flow chart showing a synthetic procedure of nanoparticles of metals and metal oxides according to the present invention.
Figure 2:
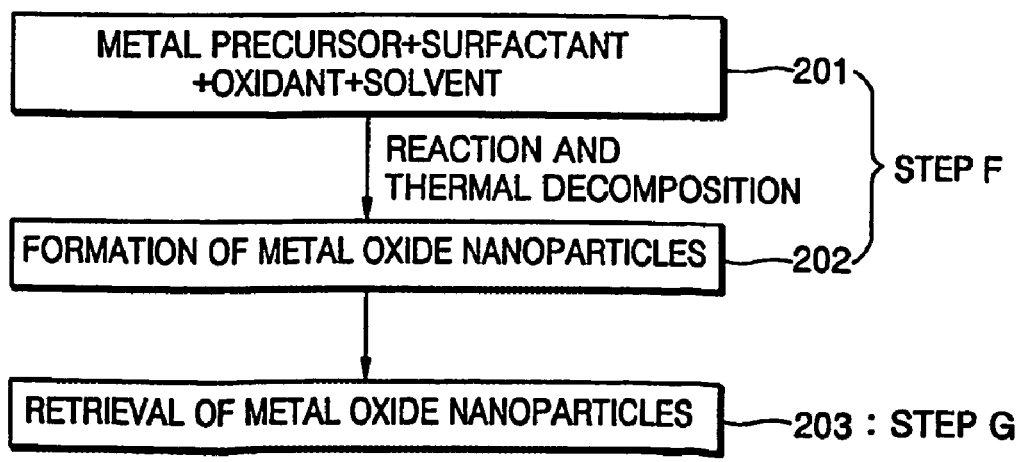
FIG. 2 is a schematic flow chart showing a direct synthetic procedure of metal oxide nanoparticles without going through a synthesis process of metal nanoparticles according to the present invention.
Figure 3:
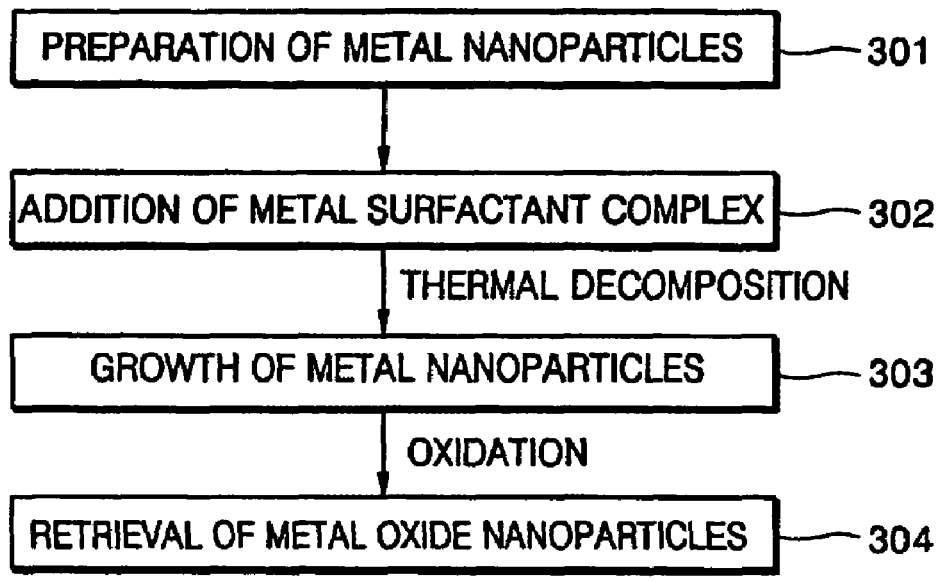
FIG. 3 is a schematic flow chart showing a synthetic procedure of larger nanoparticles by growing the nanoparticles.
Figure 4:
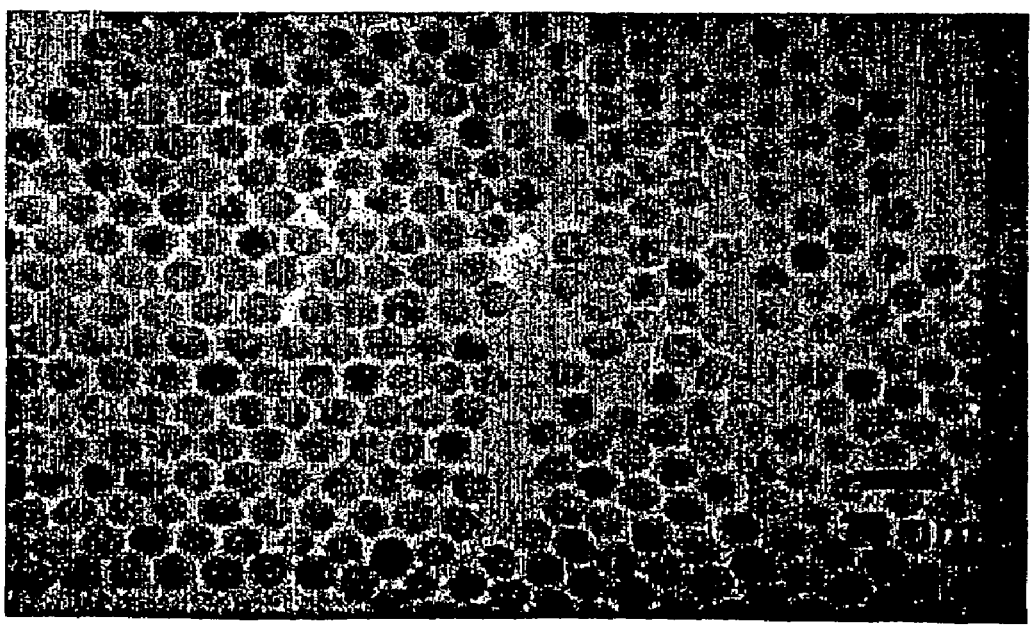
FIG. 4 is an exemplary TEM image of the spherical iron nanoparticles of 11 nm in diameter synthesized according to Embodiment 1.

As a first exemplary embodiment of synthesizing monodisperse and spherically shaped iron nanoparticles according to the present invention disclosed here, 0.2 mL of iron pentacarbonyl[$Fe(CO)_5$] was added to a mixture containing 10 mL of dehydrated octyl ether and 1.25 g of oleic acid under inert atmosphere, and heated the resulting mixture at 110° C. to obtain an iron-oleic acid complex, where the resulting reactant mixture was heated to reflux and was aged for 1 hour at the reflux temperature. During this process, the iron pentacarbonyl[$Fe(CO)_5$] was thermally decomposed completely, and iron atoms were generated. The resulting solution was cooled to room temperature, and ethanol was added to yield a black precipitate, which was then separated by centrifuging. The resulting supernatant was discarded. After repeating this washing process at least three times, the ethanol contained in the remainder was removed by vacuum drying. The resulting product was redispersed easily in hexane to form desired iron nanoparticles. The measured diameter of the resulting nanoparticles The TEM (Transmission Electron Microscope) image of the resulting product, iron nanoparticles, synthesized by the methods presented here according to the present invention is shown in FIG. 4, which is an exemplary TEM image of the 11 nm spherical iron nanoparticles of 11 nm in diameter synthesized according to Embodiment 1, which image indicates that the resulting nanoparticles are spherically shaped and uniform, and also they appear to be monodisperse.

EMBODIMENT 2

Synthesis of Monodisperse and Spherically Shaped Iron Oxide Nanoparticles-1

Figure 5:
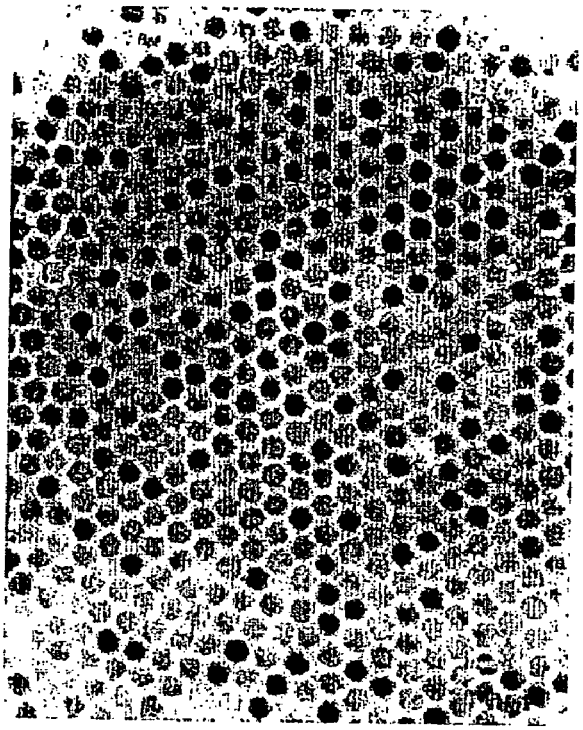
FIG. 5 is an exemplary TEM image of a 2-dimensional array of the spherical iron oxide nanoparticles of 11 nm in diameter synthesized according to Embodiment 2.
Figure 6:
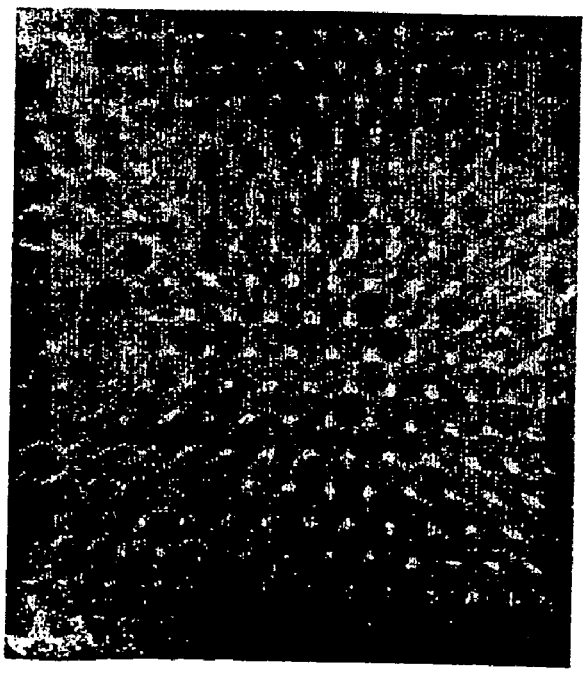
FIG. 6 is an exemplary. TEM image of a 3-dimensional array of the spherical iron oxide nanoparticles of 11 nm in diameter synthesized according to Embodiment 2.
Figure 7:
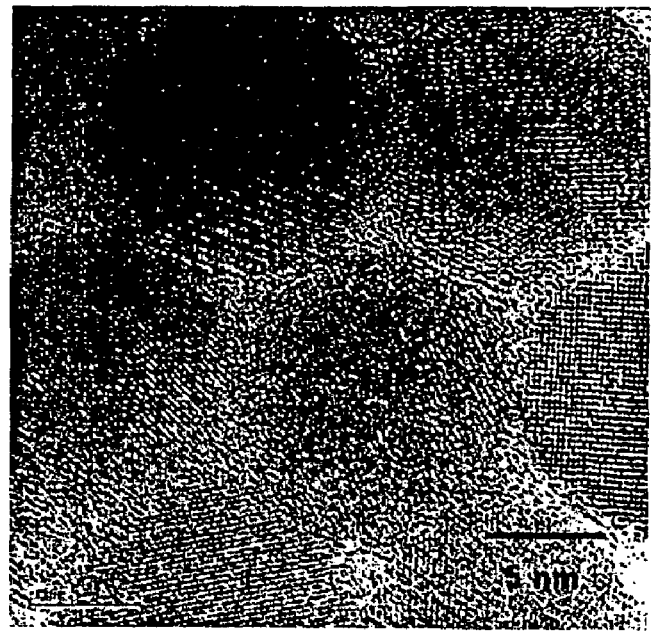
FIG. 7 is an exemplary high resolution TEM image of spherical iron oxide nanoparticles of 11 nm in diameter synthesized according to Embodiment 2.

In order to synthesize monodisperse and spherically shaped iron oxide nanoparticles of 7 nm in diameter according to the present invention, similarly to the procedure described in Embodiment 1 above, 0.2 mL of iron pentacarbonyl [$Fe(CO)_5$] was added to a mixture containing 10 mL of dehydrated octyl ether and 1.25 g of oleic acid under an inert atmosphere and the resulting mixture is heated at 110° C. to form an iron-oleic acid complex. The resulting reactant mixture was heated to reflux and aged for 1 hour at the reflux temperature. During this process, Iron pentacarbonyl[$Fe(CO)_5$] was thermally decomposed completely and iron atoms were generated. In order to obtain monodisperse and spherically shaped iron oxide(maghemite, $\gamma$-$Fe_2O_3$) nanoparticles, the resulting red colored solution was cooled to room temperature. Then, 0.36 g of trimethylamine N-oxide, an oxidant, was added, and the resulting black colored mixture was again heated to 300° C. and maintained at this temperature for 30 minutes, and as a result, a brown solution was formed. This color change from red to brown observed visually indicating that an iron oxide was formed. The oxide solution was cooled to room temperature. To remove excess surfactant and the by-product, anhydrous—highly degassed ethanol was added to wash, yielding a black precipitate. The supernatant was separated and discarded by either decantation or centrifugation. After this washing process was repeated at least three times, the ethanol was removed by vacuum drying. The resulting product was easily redispersed in hexane. The TEM images of the resulting products of iron nanoparticles synthesized according to this procedure, are shown in FIGS. 5 through 7, where an exemplary TEM image of a 2-dimensional array of the spherical iron oxide nanoparticles of 11 nm in diameter synthesized according to the present invention is shown in FIG. 5, and an exemplary TEM image of a 3-dimensional array of the spherical iron oxide nanoparticles of 11 nm in diameter synthesized according to the present invention is shown in FIG. 6, and also an exemplary high resolution TEM image of the spherical iron oxide nanoparticles of 11 nm In diameter synthesized according to the present invention presented in this Embodiment 2 is shown in FIG. 7, respectively. The TEM images in FIGS. 5 through 7 illustrate that the spherical iron oxide nanoparticles of 11 nm in diameter synthesized according to the present invention presented in Embodiment 2 are monodisperse.

EMBODIMENT 3

Synthesis of Monodisperse Spherical Iron Oxide Nanoparticles-2

Figure 8:
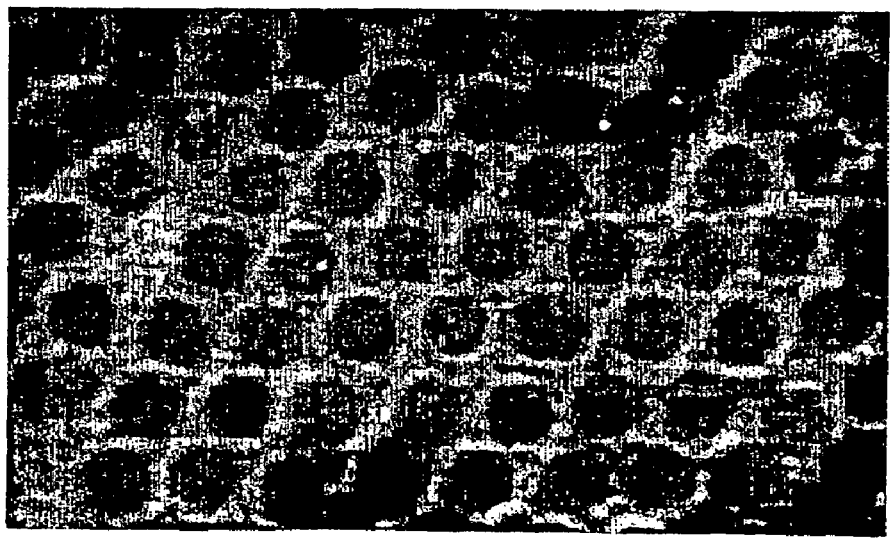
FIG. 8 is an exemplary TEM image of the spherical iron oxide nanoparticles of 7 nm in diameter synthesized according to Embodiment 3.

Monodisperse spherical metal oxide nanoparticles of 7 nm in diameter were synthesized using the same reaction conditions described in Embodiment 2, except that the amount of the surfactant used is reduced to 0.85 g. An exemplary TEM image of the 7 nm spherical iron oxide nanoparticles synthesized according to the present invention is as shown in FIG. 8, indicating that the 7 nm spherical iron oxide nanoparticles are monodisperse.

EMBODIMENT 4

Synthesis of Monodisperse Spherical Iron Oxide Nanoparticles-3

Figure 9:
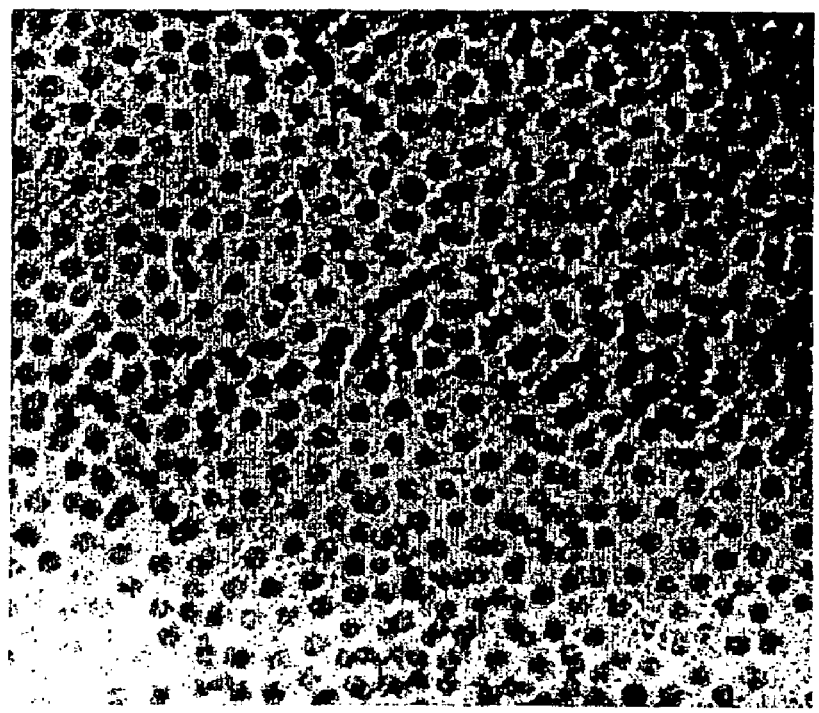
FIG. 9 is an exemplary TEM image of the spherical iron oxide nanoparticles of 4 nm in diameter synthesized according to Embodiment 4.

Monodisperse spherical metal oxide nanoparticles of 4 nm in diameter were synthesized using the same reaction conditions described in Embodiment 2, except that the amount of the surfactant used is reduced to 0.43 g. An exemplary TEM image of the 4 nm spherical iron oxide nanoparticles synthesized according to the present invention is as shown in FIG. 9, indicating that the 4 nm spherical iron oxide nanoparticles are monodisperse.

EMBODIMENT 5

Synthesis of Monodisperse Spherical Iron Oxide Nanoparticles-4

Figure 10:
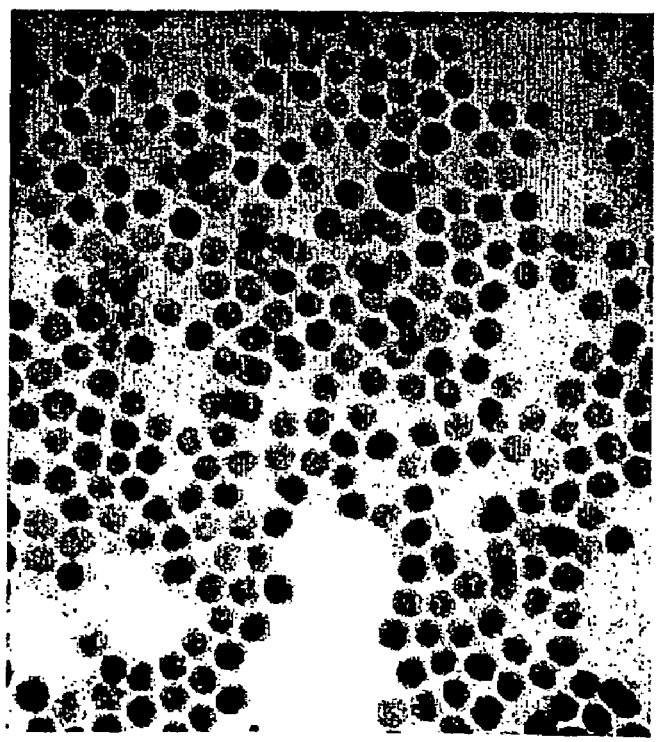
FIG. 10 is an exemplary TEM image of the spherical iron oxide nanoparticles of 16 nm in diameter synthesized according to Embodiment 5.

Monodisperse spherical metal oxide nanoparticles of 16 nm in diameter were synthesized using the same reaction conditions described in Embodiment 2, except that the amount of the surfactant used is increased to 1.72 g. An exemplary TEM image of the 16 nm spherical iron oxide nanoparticles synthesized according to present invention is shown in FIG. 10, indicating that the 16 nm spherical iron oxide nanoparticles are monodisperse.

EMBODIMENT 6

Direct Synthesis of Monodisperse Spherical Iron Oxide Nanoparticles-5

Figure 11:
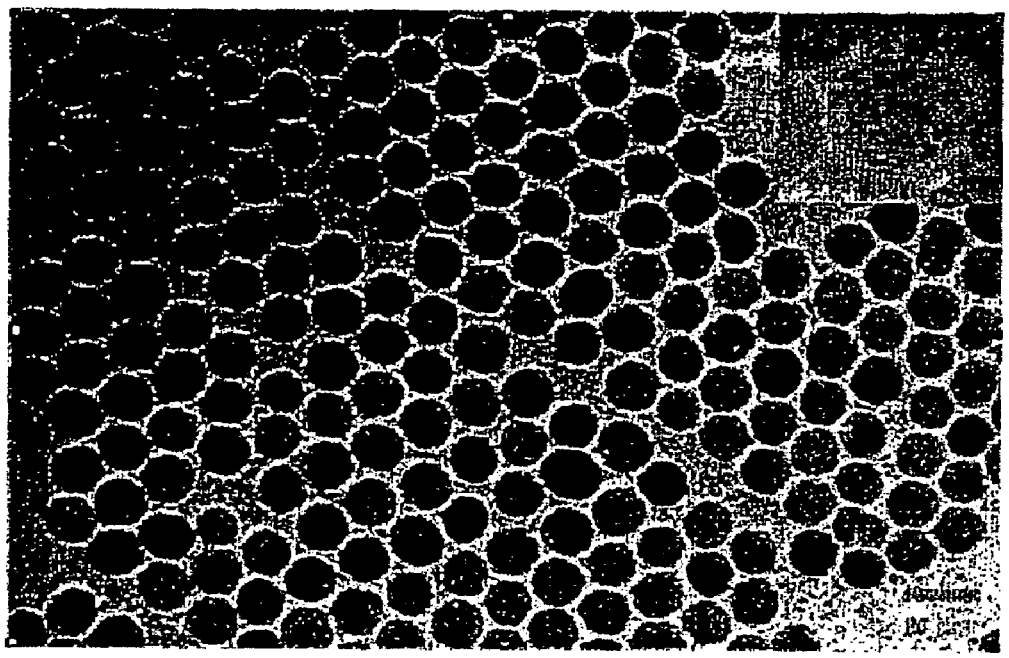
FIG. 11 is an exemplary TEM image of a 2-dimensional array of the spherical iron oxide nanoparticles of 13 nm in diameter synthesized according to Embodiment 6.

0.2 mL of iron pentacarbonyl ($Fe(CO)_5$) was injected into a solution containing 7 mL of dehydrated octyl ether, 0.91 g of lauric acid, and 0.57 g of trimethylamine N-oxide at 100 in inert atmosphere. As soon as iron pentacarbonyl ($Fe(CO)_5$) was injected into the mixture, the temperature rose to 120° C. and iron oxide nuclei were generated. This solution was heated to 300° C. and kept it for 1 hour. During this process, iron pentacarbonyl ($Fe(CO)_5$) was thermally decomposed completely. At this time the initial black solution was turned into red and the solution color gradually became brown as the temperature was increased, indicating visually that iron oxide was formed. To remove excess surfactant and by-product, anhydrous and degassed ethanol was added to yield a black precipitate. The supernatant was discarded either by decantation or by centrifugation. After this washing process was repeated three times or more, ethanol was removed by vacuum drying. The resulting product was easily redispersed in hexane. The TEM image of the resulting product synthesized according to Embodiment 6 is presented in FIG. 11. FIG. 11 is an example of the TEM image of a 2-dimensional array of 13 nm spherical iron oxide nanoparticles synthesized according to Embodiment 6. The TEM image of FIG. 11 reveals that the 13 nm spherical iron oxide nanoparticles are monodisperse.

EMBODIMENT 7

Figure 12:
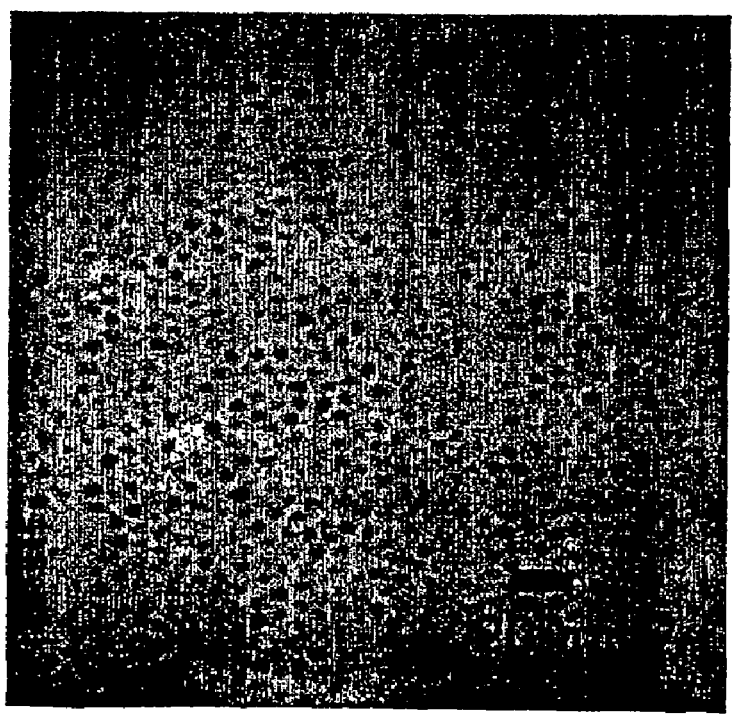
FIG. 12 is an exemplary TEM image of a 2-dimensional array of the spherical cobalt-iron alloy nanoparticles of 6 nm in diameter synthesized according to Embodiment 7.

Synthesis of Spherical Iron-Cobalt Alloy Nanoparticles 0.3 mL of iron pentacarbonyl ($Fe(CO)_5$) and 0.15 mL of cyclopentadienyloobalt tricarbonyl ($Co(CO)_3(C_5H_5)$) were added to a mixture containing 10 mL of dehydrated octyl ether and 0.9 g of oleic acid under an inert atmosphere and heated at 110° C., which generated the mixture of iron-oleic acid and cobalt-oleic acid complexe. The resulting reaction mixture was heated to 300° C. and aged for 1 hour at this temperature. During this process, an organometallic precursor was thermally decomposed completely and metal alloy nanoparticles were formed. In order to obtain monodisperse spherical iron-cobalt alloy nanoparticles, anhydrous and degassed ethanol was added to yield a black precipitate. The supernatant was discarded either by decantation or by centrifugation. After this washing process was repeated at least three times, ethanol was removed by vacuum drying. The resulting product was easily redispersed in hexane. A TEM image of the resulting product synthesized according to Embodiment 7 is shown in FIG. 12. FIG. 12 is an example of a TEM image of a 2-dimensional array of 6 nm spherical cobalt-iron alloy nanoparticles synthesized according to Embodiment 7. The TEM image of FIG. 12 indicates that the 6 nm spherical iron-cobalt alloy nanoparticles are monodisperse.

EMBODIMENT 8

Synthesis of Monodisperse Spherical Cobalt Ferrite ($CoFe_2O_4$) Nanoparticles-1

Figure 13:
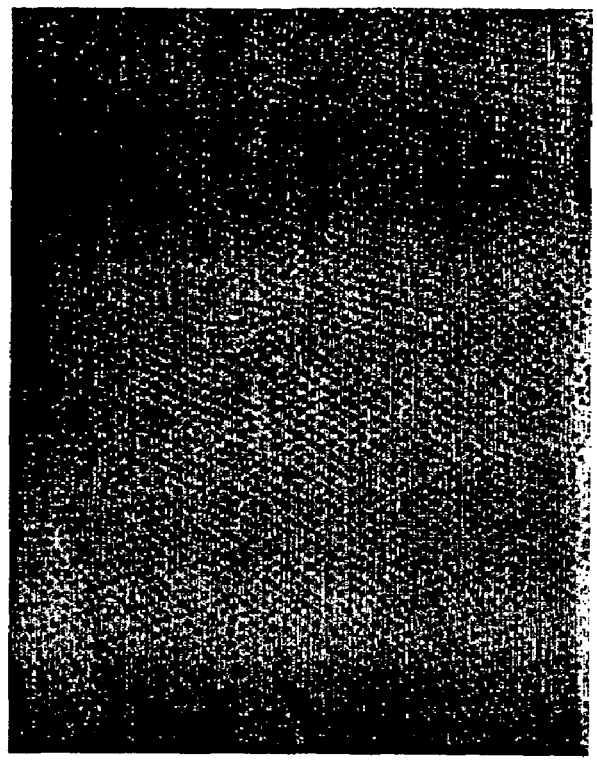
FIG. 13 is an exemplary TEM image of a 2-dimensional array of the spherical cobalt ferrite ($CoFe_2O_4$) nanoparticles of 9 nm in diameter synthesized according to Embodiment B.

0.3 mL of iron pentacarbonyl ($Fe(CO)_5$) and 0.15 mL of cyclopentadienylcobalt tricarbonyl ($Co(CO)_3(C_5H_5)$) were added to a mixture containing 10 mL of dehydrated octyl ether and 1.95 g of oleic acid under inert atmosphere and heated at 110° C. The resulting mixture was heated to 300° C. and kept for 30 minutes at this temperature. During this process, the organometallic precursors were thermally decomposed completely and metal alloy nanoparticles were formed. In order to obtain the monodisperse spherical cobalt ferrite nanoparticles, the solution was cooled to room temperature, and 0.38 g of trimethylamine N-oxide was added. The mixture was then heated to 300° C. and maintained at this temperature for 30 min, whereupon it formed a brown solution and this color change from red to brown indicated visually the cobalt ferrite was formed. And then the solution was cooled to room temperature again. To remove excess surfactant and by-product, anhydrous and degassed ethanol was added to yield a black precipitate. The supernatant was discarded either by decanting or by centrifugation. After this washing process was repeated three times or more, ethanol was removed by vacuum drying. The resulting products were easily redispersed in hexane. The TEM image of metal oxide nanoparticles synthesized according to this procedure is shown in FIG. 13. FIG. 13 is an example of a TEM image of a 2-dimensional array of 9 nm spherical cobalt ferrite ($CoFe_2O_4$) nanoparticles synthesized according to Embodiment 8. The TEM image of FIG. 13 indicates that the 9 nm spherical cobalt ferrite ($CoFe_2O_4$) nanoparticles are monodisperse.

EMBODIMENT 9

Synthesis of Monodisperse Spherical Cobalt Ferrite ($CoFe_2O_4$) Nanoparticles-2

Figure 14:
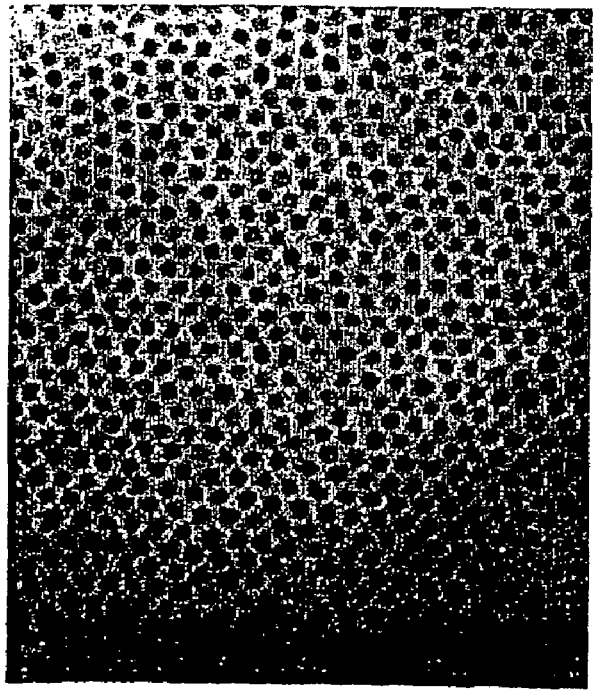
FIG. 14 is an exemplary TEM image of a 2-dimensional array of the spherical cobalt ferrite ($CoFe_2O_4$) nanoparticles of 6 nm in diameter synthesized according to Embodiment 9.
Figure 15:
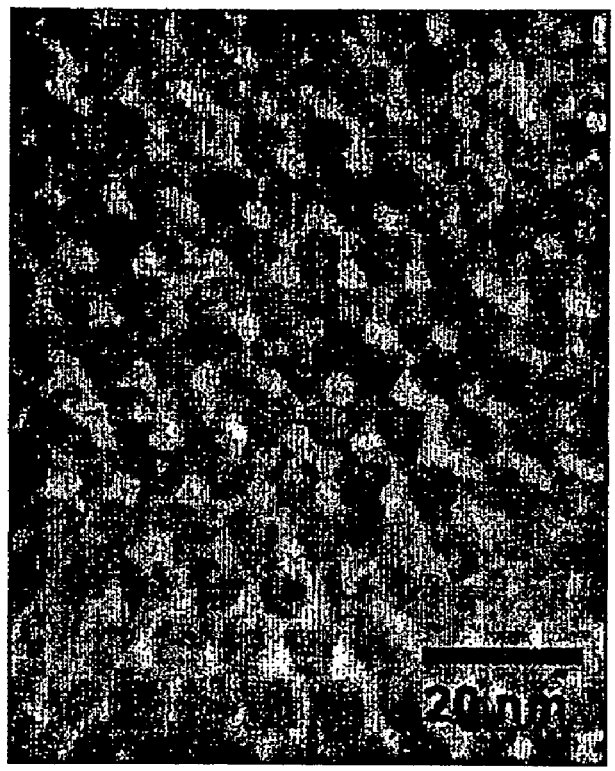
FIG. 15 is an exemplary TEM image of a 3-dimensional array of the spherical cobalt ferrite ($CoFe_2O_4$) nanoparticles of 6 nm in diameter synthesized according to Embodiment 9.

Monodisperse spherical cobalt ferrite ($CoFe_2O_4$) nanoparticles were synthesized using the same reaction conditions with Embodiment 8, except that the amount of the surfactant used is reduced to 0.9 g. The TEM images of nanoparticles synthesized according to this procedure are shown in FIGS. 14 and 15. FIG. 14 is an example of TEM image of a 2-dimensional array of 6 nm spherical cobalt ferrite ($CoFe_2O_4$) nanoparticles synthesized according to Embodiment 9, and FIG. 15 is an example of TEM image of a 3-dimensional array of 6 nm spherical cobalt ferrite ($CoFe_2O_4$) nanoparticles synthesized according to Embodiment 9. The TEM images of FIGS. 14 and 15 indicate that the 6 nm spherical cobalt ferrite ($CoFe_2O_4$) nanoparticles are monodisperse.

EMBODIMENT 10

Synthesis of Monodisperse Spherical Cobalt Ferrite ($CoFe_2O_4$) Nanoparticles-3

Figure 16:
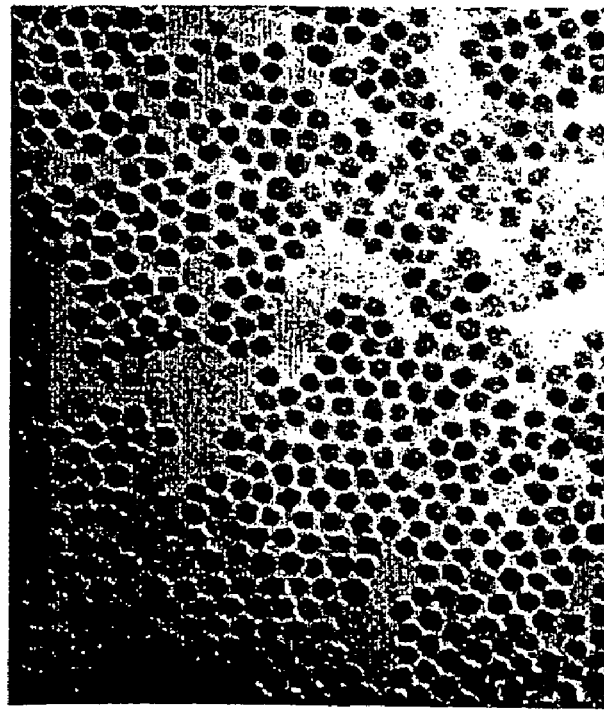
FIG. 16 is an exemplary TEM image of a 2-dimensional array of the spherically shaped cobalt ferrite ($CoFe_2O_4$) nanoparticles of 8 nm synthesized according to Embodiment 10.

Monodisperse spherical cobalt ferrite ($CoFe_2O_4$) nanoparticles were synthesized using the same reaction conditions with Embodiment 8, except that the amount of the surfactant used is reduced to 1.2 g. A TEM image of nanoparticles synthesized according to this procedure is shown in FIG. 16. FIG. 16 is an example of TEM image of a 2-dimensional array of 8 nm spherical cobalt ferrite ($CoFe_2O_4$) nanoparticles synthesized according to Embodiment 10. The TEM image of FIG. 16 indicates that the 8 nm spherical cobalt ferrite ($CoFe_2O_4$) nanoparticles are monodisperse.

EMBODIMENT 11

Magnetic Property of Spherical Iron Oxide Nanoparticles

The magnetic property was tested on the 4, 13, and 16 nm sized spherical iron oxide nanoparticles synthesized according to Embodiments 4, 5 and 6 by using a superconducting quantum interference device (SQUID). The temperature dependence of the magnetization was measured using zero-field cooling (ZFC) and field cooling (FC) procedures in an applied magnetic field of 100 One between 5 and 300 K. The resulting plot of temperature versus magnetization with ZFC is shown in FIG. 17. FIG. 17 is a graph of magnetization versus temperature curves for 4, 13, and 16 nm spherical iron oxide nanoparticles synthesized using the methods in Embodiments 4, 5, and 6, respectively. The graph of FIG. 17 indicates that the blocking temperatures of the spherical iron oxide nanoparticles with particle diameters of 4, 13 and 16 nm were found to be 25, 200, and 290° K, respectively. In particular, because nanoparticles with the diameter of over 16 nm are ferrimagnetic, they can be used for magnetic data storage devices.

INDUSTRIAL APPLICABILITY

The monodisperse and highly crystalline nanoparticles of metals, alloys and metal oxides synthesized according to the present invention display very unique and good and consistent electrical, magnetic as well as optical properties. Particularly, their magnetic property due to excellent uniformity in size of the metal, alloy and metal oxide nanoparticles is attractive for using such nanoparticles as high density magnetic storage media such as hard disks and magnetic tapes, and also such monodisperse and highly crystalline nanoparticles are potentially useful for forming ultra-small single-electron transistor devices and for highly efficient laser light sources.

What is claimed is:

1. A method for producing monodisperse nanoparticles of metal or metal alloys, comprising:
    forming a metal-surfactant complex through a reaction of materials consisting of a metal precursor and a surfactant in a solvent to form a solution;
    heating said metal-surfactant complex solution gradually and continually at a rate of 0.1° C./min. to 20° C./min. up to a temperature of reflux for the solvent to cause an abrupt thermal decomposition of said metal-surfactant complex and instantaneous nucleation of the monodisperse nanoparticles; and
    separating said synthesized monodisperse nanoparticles of metal or metal alloys by adding a poor solvent without a size-selective precipitation step.

2. The method of claim 1, wherein said monodisperse nanoparticles of metal or metal alloys are further processed into highly crystalline monodisperse metal oxide nanoparticles, produced by the method further comprising:
    synthesizing said metal oxide nanoparticles by treating said synthesized monodisperse nanoparticles with an oxidant for a controlled oxidation process; and
    separating said synthesized metal oxide nanoparticles by adding a poor solvent followed by centrifuging.

3. The method of claim 2, wherein said oxidant is selected from the group consisting of amine N-oxide, hydrogen peroxide, and oxygen.

4. The method of claim 3, wherein the amine N-oxide is selected from the group consisting of pyridine N-oxide and trimethylamine N-oxide.

5. The method of claim 2, wherein said oxidant is added at a temperature between −100° C. to 200° C., and the resulting mixed solution is heat-treated at a temperature ranging from 30° C. to 500° C. for a duration ranging from 1 minute to 24 hours continuously to synthesize said metal oxide nanoparticles.

6. The method of claim 5, wherein the heating rate is in the range of 1° C./min. to 20° C./min.

7. The method of claim 2, wherein a molar ratio of said metal oxide nanoparticles to said oxidant ranging from 1:0.1 to 1:100 is maintained.

8. The method of claim 1, wherein said metal precursor comprises a metallic compound ligand of at least one metal selected from the group consisting of Fe, Co, Ni, Cr, Mn, Ba, Sr, Ti, Zr, Pt and Pd.

9. The method of claim 8, wherein the metallic compound ligand is selected from the group consisting of CO, NO, $C_5H_5$ and alkoxides.

10. The method of claim 1, wherein said metal precursor is selected from the group consisting of iron pentacarbonyl[Fe$(CO)_5$], ferrocene, cobalt tricarbonylnitrosyl[Co$(CO)_3$(NO)], cyclopentadienylcobalt-tricarbonyl[Co$(CO)_3$($C_5H_5$)], dicobalt octacarbonyl[$CO_2(CO)_8$], chromium hexacarbonyl[Cr$(CO)_6$], nickel tetracarbonyl[Ni$(CO)_4$], dimanganese decacarbonyl[$Mn_2(CO)_{10}$], iron acetylacetonate[Fe(acac)$_3$], cobalt acetylacetonate[Co(acac)$_3$], barium acetylacetonate[Ba(acac)$_2$], strontium acetylacetonate[Sr(acac)$_2$], platinum acetylacetonate[Pt(acac)$_2$], palladium acetylacetonate[Pd(acac)$_2$], titanium tetraisopropoxide[Ti$(OC_3H_7)_4$], zirconium tetrabutoxide[Zr$(OC_4H_9)_4$], iron (III) chloride[FeCl$_3$], iron (II) chloride[FeCl$_2$], iron(II) sulfate [FeSO$_4$], iron(III) nitrate[Fe$(NO_3)_3$], cobalt(III) chloride [COCl$_3$], cobalt (II) chloride[COCl$_2$], cobalt(III) nitrate[Co$(NO_3)_3$], nickel(II) sulfate[NiSO$_4$], nickel (II) chloride [NiCl$_2$], nickel(II) nitrate[Ni$(NO_3)_2$], titanium tetrachloride [TiCl$_4$], zirconium tetrachloride[ZrCl$_4$], hydrogen hexachloroplatinate (IV)[$H_2PtCl_6$], hydrogen hexachloropalladiate(IV)[$H_2PdCl_6$], barium chloride[BaCl$_2$], barium sulfate[BaSO$_4$], strontium chloride[SrCl$_2$], and strontium sulfate[SrSO$_4$].

11. The method of claim 1, wherein said surfactant is selected from the group consisting of cationic surfactants, neutral surfactants, and anionic surfactants.

12. The method of claim 11, wherein the cationic surfactant is an alkyltrimethylammonium halide system.

13. The method of claim 12, wherein the alkyltrimethylammonium halide system is cetyltrimethylammonium bromide.

14. The method of claim 11, wherein the neutral surfactant is selected from the group consisting of oleic acid, trioctylphosphine oxide (TOPO), triphenylphosphine (TOP), and alkyl amine.

15. The method of claim 14, wherein the alkyl amine is selected from the group consisting of oleylamine, trioctylamine, octylamine, and alkylthiol.

16. The method of claim 11, wherein the anionic surfactant is selected from the group consisting of sodium alkylsulfate and sodium alkylphosphate.

17. The method of claim 1, wherein said solvent is selected from the group consisting of ether compounds, heterocyclic compounds, aromatic compounds, dimethyl sulfoxide (DMSO), dimethylformamide (DMF), alcohols, hydrocarbons, and water.

18. The method of claim 17, wherein the ether compound is selected from the group consisting of octyl ether, butyl ether, hexyl ether, and decyl ether.

19. The method of claim 17, wherein the heterocyclic compound is selected from the group consisting of pyridine and tetrahydrofurane (THF).

20. The method of claim 17, wherein the aromatic compound is selected from the group consisting of toluene, xylene, mesitylene and benzene.

21. The method of claim 17, wherein the alcohol is selected from the group consisting of octylalcohol and decanol.

22. The method of claim 17, wherein the hydrocarbon is selected from the group consisting of pentane, hexane, heptane, octane, decane, dodecane, tetradecane and hexadecane.

23. The method of claim 1, wherein said metal precursor is injected into a solution containing said surfactant at 30° C. to 200° C. in the step of forming a metal-surfactant complex.

24. The method of claim 1, wherein said metal-surfactant complex is decomposed at 50° C. to 500° C. in the step of forming said monodisperse nanoparticles.

25. The method of claim 24, wherein the heating rate for reaching said decomposition temperature is in the range of 1° C./min. to 2° C./min.

26. The method of claim 1, wherein said monodisperse nanoparticles of metal or metal alloys are precipitated from a dispersed solution by adding a poor solvent followed by a centrifugation process.

27. The method of claim 1, wherein a molar ratio of said metallic precursor to said surfactant ranging from 1:0.1 to 1:100 is maintained.

28. The method of claim 1, further comprising a step of increasing the size of said monodisperse nanoparticles of metal or metal alloys smaller than 11 nm by heat-treating a mixed solution of said metal surfactant complex and said nanoparticles of a size smaller than 11 nm, where the molar ratio of said monodisperse nanoparticles and said metal surfactant complex is in the range of 1:0.1 to 1:100.

29. A method of direct synthesis of metal oxide monodisperse nanoparticles comprising:
   adding materials consisting of a metal precursor, an oxidant, and a surfactant to a solvent in one container to prepare a mixed solution;
   heating said mixed solution gradually and continually at a rate of 0.1° C./min. to 20° C./min. up to a temperature of reflux for the solvent to cause an abrupt thermal decomposition of said metal-surfactant complex and instantaneous nucleation of the metal nanoparticles; and
   separating said metal oxide monodisperse nanoparticles by adding a poor solvent followed by a centrifugation process without size selective precipitation process.

30. The method of claim 29, wherein said mixed solution is heat-treated at a temperature in the range of 30° C. to 500° C. for a duration from 1 minute to 24 hours continuously to synthesize said metal oxide nanoparticles.

31. The method of any of claims 1, 2, or 16, wherein the resulting monodisperse metal or metal oxide nanoparticles form a superlattice by self assembly and produce a magnetic storage media with a very high area density.

* * * * *